(12) United States Patent
Lee et al.

(10) Patent No.: US 10,431,798 B2
(45) Date of Patent: Oct. 1, 2019

(54) SEPARATOR FOR LITHIUM SECONDARY BATTERY, AND LITHIUM SECONDARY BATTERY COMPRISING SAME

(71) Applicants: Samsung SDI Co., Ltd., Yongin-si, Gyeonggi-do (KR); Samsung Electronics Co., Ltd., Suwon-si, Gyeonggi-do (KR)

(72) Inventors: Byungmin Lee, Suwon-si (KR); Myungkook Park, Suwon-si (KR); Seungrim Yang, Seongnam-si (KR); Eon-Mi Lee, Yongin-si (KR); Bokyung Jung, Yongin-si (KR); Sungsoo Han, Hwaseong-si (KR); Hana Kim, Suwon-si (KR); Jungsue Jang, Suwon-si (KR); Minho Cho, Suwon-si (KR); Hyoungwoo Choi, Hwaseong-si (KR)

(73) Assignees: Samsung SDI Co., Ltd., Yongin-si (KR); Samsung Electronics Co., Ltd., Suwon-si (KR)

( * ) Notice: Subject to any disclaimer, the term of this patent is extended or adjusted under 35 U.S.C. 154(b) by 156 days.

(21) Appl. No.: 15/540,466

(22) PCT Filed: Dec. 22, 2015

(86) PCT No.: PCT/KR2015/014110
§ 371 (c)(1),
(2) Date: Jun. 28, 2017

(87) PCT Pub. No.: WO2016/108495
PCT Pub. Date: Jul. 7, 2016

(65) Prior Publication Data
US 2018/0006285 A1     Jan. 4, 2018

(30) Foreign Application Priority Data

Dec. 30, 2014   (KR) ........................ 10-2014-0194172

(51) Int. Cl.
*H01M 2/16* (2006.01)
*C08J 5/22* (2006.01)
(Continued)

(52) U.S. Cl.
CPC ............... *H01M 2/166* (2013.01); *C08J 5/22* (2013.01); *C08J 5/2281* (2013.01); *C08L 71/02* (2013.01);
(Continued)

(58) Field of Classification Search
CPC ...... H01M 2/1653; H01M 2/14; H01M 2/166; H01M 2/1686; H01M 10/052
(Continued)

(56) References Cited

U.S. PATENT DOCUMENTS

| 5,554,414 A | 9/1996 | Moya et al. |
| 7,422,826 B2 | 9/2008 | Xing et al. |

(Continued)

FOREIGN PATENT DOCUMENTS

| CN | 1770540 A | 5/2006 |
| CN | 101563808 A | 10/2009 |

(Continued)

OTHER PUBLICATIONS

As evidence by https://americas.sartomer.com/techlitdetail.asp?plid=1&sgid=5&prid=SR494 accessed on Feb. 5, 2018.*

(Continued)

*Primary Examiner* — Cynthia H Kelly
*Assistant Examiner* — Rashid A Alam
(74) *Attorney, Agent, or Firm* — Lewis Roca Rothgerber Christie LLP

(57) ABSTRACT

Provided are a separator for a lithium secondary battery including a substrate and a heat-resistance porous layer disposed on at least one surface of the substrate and including a cross-linked binder, wherein the cross-linked binder (Continued)

has a cross-linking structure of a compound represented by Chemical Formula 2, and a lithium secondary battery including the same.

5 Claims, 1 Drawing Sheet

(51) Int. Cl.
  *C08L 71/02* (2006.01)
  *H01M 10/052* (2010.01)
  *H01M 10/42* (2006.01)
  *H01M 10/0525* (2010.01)

(52) U.S. Cl.
  CPC ........... *H01M 2/16* (2013.01); *H01M 2/1626* (2013.01); *H01M 2/1653* (2013.01); *H01M 2/1686* (2013.01); *H01M 10/052* (2013.01); *H01M 10/0525* (2013.01); *H01M 10/4235* (2013.01); *C08J 2323/06* (2013.01); *C08J 2427/16* (2013.01); *Y02T 10/7011* (2013.01)

(58) Field of Classification Search
  USPC ........................................................ 429/247
  See application file for complete search history.

(56) References Cited

U.S. PATENT DOCUMENTS

| | | | |
|---|---|---|---|
| 2003/0104282 A1 | 6/2003 | Xing et al. | |
| 2010/0304205 A1 | 12/2010 | Jo et al. | |
| 2013/0157107 A1 | 6/2013 | Chung et al. | |
| 2013/0224559 A1* | 8/2013 | Furutani | H01M 2/145 429/145 |
| 2013/0236766 A1 | 9/2013 | Seo et al. | |
| 2015/0111086 A1* | 4/2015 | Arnold | H01M 2/1686 429/144 |
| 2015/0140404 A1* | 5/2015 | Yoo | H01M 2/1653 429/145 |
| 2015/0303428 A1* | 10/2015 | Sawada | H01M 2/1653 429/145 |
| 2017/0051116 A1 | 2/2017 | Takahashi et al. | |

FOREIGN PATENT DOCUMENTS

| | | |
|---|---|---|
| CN | 101635377 A | 1/2010 |
| CN | 102017240 A | 4/2011 |
| CN | 102903953 A | 1/2013 |
| JP | 2008-210791 A | 9/2008 |
| JP | 2012-48987 A | 3/2012 |
| JP | WO2013/151144 A1 | 10/2013 |
| JP | 5593003 B1 | 9/2014 |
| KR | 2001-0101307 A | 11/2001 |
| KR | 10-2006-0112822 A | 11/2006 |
| KR | 10-0775310 | 11/2007 |
| KR | 10-2008-0058197 | 6/2008 |
| KR | 10-2009-0056811 A | 6/2009 |
| KR | 10-2010-0119888 A | 11/2010 |
| KR | 10-1002161 | 12/2010 |
| KR | 10-1135500 | 4/2012 |
| KR | 10-1262880 B1 | 5/2013 |
| KR | 10-2013-0080451 A | 7/2013 |
| KR | 10-2013-0092245 | 8/2013 |
| KR | 10-2013-0097679 A | 9/2013 |
| KR | 10-1430975 | 8/2014 |
| KR | 10-2014-0145450 | 12/2014 |
| KR | 10-1551757 | 9/2015 |
| WO | WO 2014/200198 A1 | 12/2014 |

OTHER PUBLICATIONS

U.S. Office Action dated Feb. 23, 2018, issued in U.S. Appl. No. 14/984,067 (22 pages).
U.S. Office Action dated Feb. 23, 2018, issued in U.S. Appl. No. 14/984,205 (21 pages).

* cited by examiner

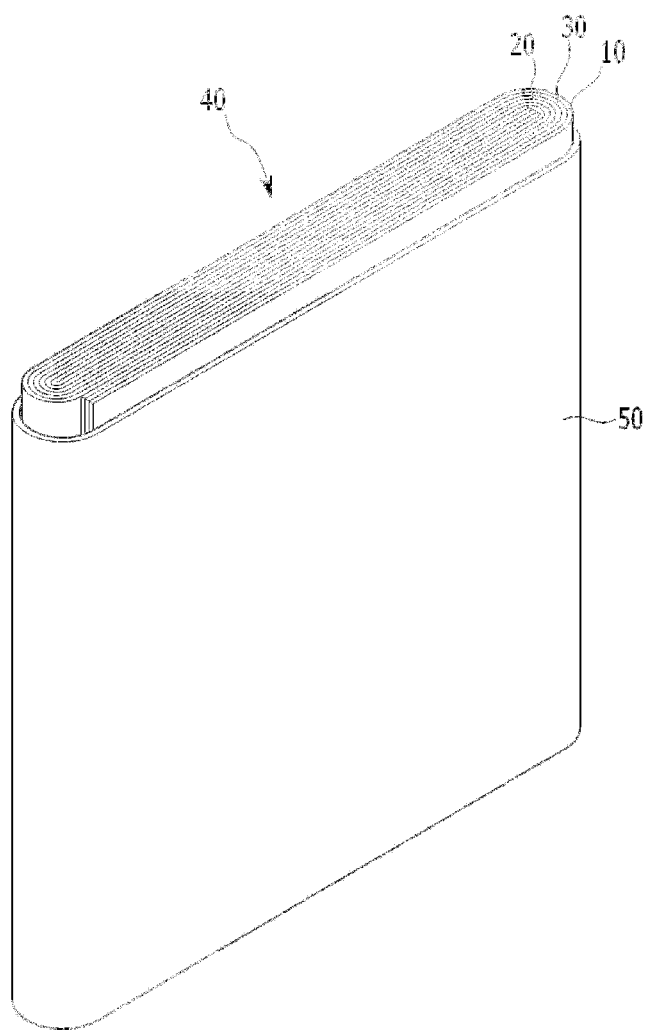

SEPARATOR FOR LITHIUM SECONDARY BATTERY, AND LITHIUM SECONDARY BATTERY COMPRISING SAME

CROSS-REFERENCE TO RELATED APPLICATION(S)

This application is a National Phase Patent Application of International Patent Application Number PCT/KR2015/014110, filed on Dec. 22, 2015, which claims priority of Korean Patent Application 10-2014-0194172, filed Dec. 30, 2014. The entire contents of both of which are incorporated herein by reference.

TECHNICAL FIELD

A separator for a lithium secondary battery and a lithium secondary battery including the same are disclosed.

BACKGROUND ART

Recently, research on a lithium secondary battery has been actively made, as necessity of a battery having high energy density as a power source for a portable electronic device is increased. In addition, since an electric vehicle and the like is researched with an increasing interest in an environment problem, research on the lithium secondary battery as a power source for the electric vehicle has been actively made.

This lithium secondary battery includes a positive electrode, a negative electrode, and a separator interposed between the positive and negative electrodes. The separator plays a role of electrically insulating the positive and negative electrodes as well as includes micropores through which lithium ions are transferred.

A separator keeps being required of excellent battery stability due to exothermicity, as a battery tends to be lighter and down-sized and keeps requiring of high capacity as a power source having high power/large capacity for the electric vehicle.

For this battery, a separator formed by coating a binder and a ceramic particle on a porous substrate is mainly used. However, this separator may rarely secure stability due to shrinkage during overheating of the battery.

DISCLOSURE

Technical Problem

An embodiment provides a separator for a lithium secondary battery having improved electrolyte solution wettability as well as improved heat resistance.

Another embodiment provides a lithium secondary battery having improved cell performance such as rate capability and stability by including the separator.

Technical Solution

An embodiment provides a separator for a lithium secondary battery including a substrate and a heat-resistance porous layer disposed on at least one surface of the substrate and including a cross-linked binder, wherein the cross-linked binder has a cross-linking structure formed from a compound represented by Chemical Formula 2.

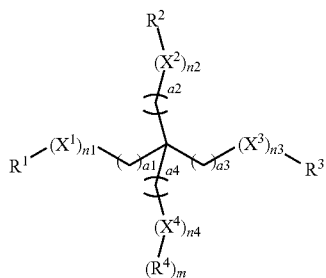

[Chemical Formula 2]

In Chemical Formula 2, each of $X^1$ to $X^3$ are an oxyethylene group, $X^4$ is an oxyethylene group or a C1 to C10 alkyl group, when $X^4$ is the oxyethylene group, $n^4$ is an integer ranging from 1 to 10 and m is 1 and when $X^4$ is the C1 to C10 alkyl group, $n^4$ is 1 and m is 0, $R^1$ to $R^4$ are independently a functional group of a (meth)acrylate group, a hydroxy group, a carboxyl group, an ester group, a cyanate group, an isocyanate group, an amino group, a thiol group, a C1 to C10 alkoxy group, a vinyl group, or a heterocyclic group, each of $a^1$ to $a^4$ are an integer ranging from 1 to 10, each of $n^1$ to $n^3$ are an integer ranging from 0 to 10, and at least one of $n^1$ to $n^4$ is an integer ranging from 1 to 10.

Another embodiment provides a lithium secondary battery including the separator.

Other embodiments are included in the following detailed description.

Advantageous Effects

A separator for a lithium secondary battery having improved electrolyte solution wettability as well as improved heat resistance is provided and thus a lithium secondary battery having improved cell performance such as rate capability and stability may be embodied.

DESCRIPTION OF DRAWINGS

FIG. 1 is an exploded perspective view of a lithium secondary battery according to an embodiment.

DESCRIPTION OF EMBODIMENTS

Hereinafter, embodiments of the present invention are described in detail. However, these embodiments are exemplary, the present invention is not limited thereto and the present invention is defined by the scope of claims.

As used herein, when a definition is not otherwise provided, 'substituted' refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C20 alkoxy group, a C1 to C20 heteroalkyl group, a C3 to C20 heteroarylalkyl group, a C3 to C20 cycloalkyl group, a C3 to C20 cycloalkenyl group, a C4 to C20 cycloalkynyl group, a C2 to C20 heterocycloalkyl group, and a combination thereof.

As used herein, when a definition is not otherwise provided, the term 'hetero' refers to one including 1 to 3 heteroatoms selected from N, O, S, and P.

Hereinafter, a separator for a lithium secondary battery is described.

A separator for a lithium secondary battery according to the present embodiment separates a negative electrode and a positive electrode and provides a transporting passage for lithium ions. The separator includes a substrate and a heat-resistance porous layer disposed on at least one side of the substrate.

The substrate may be porous due to pores. Lithium ions are transferred through the pores. The substrate may be, for example polyolefin, polyester, polytetrafluoroethylene (PTFE), polyacetal, polyamide, polyimide, polycarbonate, polyetheretherketone, polyaryletherketone, polyetherimide, polyamideimide, polybenzimidazole, polyethersulfone, polyphenyleneoxide, a cyclic olefin copolymer, polyphenylene sulfide, polyethylenenaphthalene, a glass fiber, or a combination thereof, but is not limited thereto. Examples of the polyolefin may be polyethylene, polypropylene, and the like, and examples of the polyester may be polyethyleneterephthalate, polybutyleneterephthalate, and the like. The substrate may be a non-woven fabric or a woven fabric. The substrate may have a single layer or multilayer structure. For example, the substrate may be a polyethylene single layer, a polypropylene single layer, a polyethylene/polypropylene double layer, a polypropylene/polyethylene/polypropylene triple layer, a polyethylene/polypropylene/polyethylene triple layer, and the like. A thickness of the substrate may be 1 μm to 40 μm, for example, 1 μm to 30 μm, 1 μm to 20 μm, 5 μm to 15 μm, or 5 μm to 10 μm. When the thickness of the substrate is within the range, short-circuit between positive and negative electrodes may be prevented without increasing internal resistance of a battery.

The heat-resistance porous layer may be formed on one side or both sides of the substrate, and include a binder.

The binder may be a cross-linked binder. The cross-linked binder may be formed by curing a monomer, an oligomer, or a polymer having a curable functional group and a cross-linked binder according to an embodiment may have a cross-linking structure formed from an ether-based compound.

The ether-based compound may include at least one oxyethylene group and at least three functional groups. Specifically, the cross-linked binder is obtained by using the ether-based compound having at least one oxyethylene group and thereby a separator having improved electrolyte solution wettability may be ensured, and accordingly conductivity of lithium ions are increased and internal resistance is decreased and thereby a lithium secondary battery having cell performance such as rate capability may be embodied. The ether-based compound may specifically include 1 to 20 oxyethylene groups, for example, 2 to 15 oxyethylene groups, or 3 to 10 oxyethylene groups in the molecule. The oxyethylene group is a linking group in the molecule and may be a linking group derived from an ethylene oxide. For example, it may be a linking group represented by Chemical Formula 1.

[Chemical Formula 1]

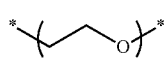

In addition, a cross-linked binder having a cross-linking structure formed from the ether-based compound having at least three functional groups, and thereby cross-linking is improved and a separator having improved heat resistance is ensured, and accordingly a lithium secondary battery having excellent thermal stability during battery explosion and overheating may be embodied. The ether-based compound may specifically have 3 to 20, for example, 3 to 15, or 3 to 10 functional groups. The functional group may be a reactive group being capable of reacting by heat or light, and may be for example a (meth)acrylate group, a hydroxy group, a carboxyl group, an ester group, a cyanate group, an isocyanate group, an amino group, a thiol group, a C1 to C10 alkoxy group, a vinyl group, a heterocyclic group, or a combination thereof. The ester group may be represented by —COOR and the amino group may be represented by —NR$^a$R$^b$ wherein R, R$^a$ and R$^b$ are a C1 to C20 alkyl group, a C2 to C20 alkenyl group, a C2 to C20 alkynyl group, a C3 to C20 cycloalkyl group, a C3 to C20 cycloalkenyl group, a C4 to C20 cycloalkynyl group, or a C6 to C30 aryl group. In addition, the heterocyclic group may be a C2 to C20 heterocycloalkyl group, a C3 to C20 heterocycloalkenyl group, a C3 to C20 heterocycloalkynyl group, or a C6 to C20 heteroaryl group, for example, an epoxy group, an oxetane group, and the like.

Specific examples of the ether-based compound may be a compound represented by Chemical Formula 2.

[Chemical Formula 2]

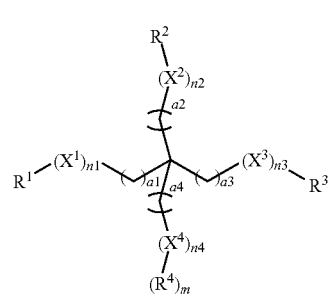

In Chemical Formula 2, $X^1$ to $X^3$ may be an oxyethylene group.

$R^1$ to $R^4$ may be the functional group.

$X^4$ may be an oxyethylene group or a C1 to C10 alkyl group. Herein, $X^4$ is the oxyethylene group, $n^4$ may be an integer of 1 to 10, for example, 1 to 5 and m may be 1 and when $X^4$ is the C1 to C10 alkyl group, $n^4$ may be 1 and m may be 0.

Each of $n^1$ to $n^3$ may be an integer of 0 to 10, for example, 0 to 5, provide that at least one of $n^1$ to $n^4$ may be an integer of 1 to 10, for example, 1 to 5. Specifically, each of $n^1$ to $n^3$ may be an integer of 1 to 10, for example, 1 to 5.

Each of $a^1$ to $a^4$ may be an integer of 1 to 10, for example, 1 to 5.

The cross-linked binder formed by cross-linking the ether-based compound represented by Chemical Formula 2 is used for forming a heat-resistance porous layer, and thereby a separator having improved heat resistance and electrolyte solution wettability may be ensured and a lithium secondary battery including such a separator has improved cell performance such as rate capability as well as thermal stability.

More specific examples of the ether-based compound may be a compound represented by Chemical Formula 3 or a compound represented by Chemical Formula 4.

[Chemical Formula 3]

[Chemical Formula 4]

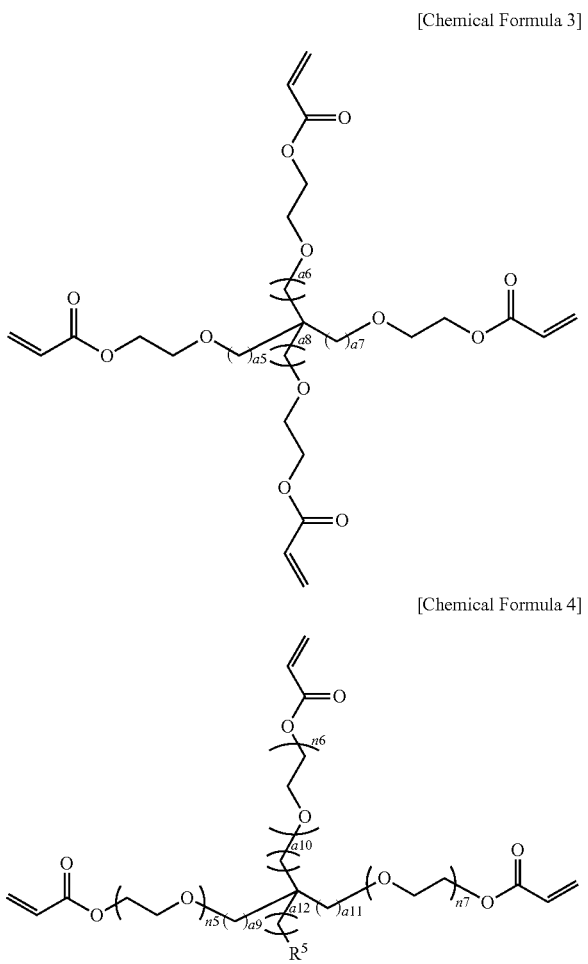

In Chemical Formulae 3 and 4, $R^5$ may be a C1 to C10 alkyl group, each of $n^5$ to $n^7$ may be an integer of 1 to 5, each of $a^5$ to $a^{12}$ may be an integer of 1 to 10, for example, 1 to 5.

The cross-linked binder may be used alone as a binder of the heat-resistance porous layer.

The heat-resistance porous layer may have a thickness of 0.01 μm to 20 μm, for example, 1 μm to 10 μm or 1 μm to 5 μm. When the thickness of the heat-resistance porous layer is within the ranges, short-circuit inside a battery may be suppressed and a safe separator may be ensured due to improved heat resistance, and increase of internal resistance of a battery may be suppressed.

Hereinafter, a separator for a lithium secondary battery according to another embodiment is described.

A separator for a lithium secondary battery according to the present embodiment includes a substrate and a heat-resistance porous layer disposed on at least one surface of the substrate, wherein the heat-resistance porous layer may include a binder and a filler. Herein, the binder may be the cross-linked binder. Since the separator according to the present embodiment further includes the filler unlike the separator according to the aforementioned embodiment even though the other constituent elements are substantially the same, the filler will be mainly illustrated herein. When the filler is added to the heat-resistance porous layer, thermal shrinkage of a substrate may be further prevented and thus short-circuit between positive and negative electrodes may be inhibited.

The filler may include an inorganic particle, an organic particle, or a combination thereof. The inorganic particle may include $Al_2O_3$, $SiO_2$, $B_2O_3$, $Ga_2O_3$, $TiO_2$, $SnO_2$, or a combination thereof, but is not limited thereto. The organic particle may be a particle including an acryl-based compound, an imide-based compound, an amide-based compound, or a combination thereof, but is not limited thereto. The organic particle may have a core-sell structure, but is not limited thereto.

The filler may have an average particle diameter of 1 nm to 2000 nm, for example, 100 nm to 1000 nm, or 300 nm to 700 nm. The filler may include at least two kinds having different particle diameters. When the filler has an average particle diameter within the range, performance of a lithium secondary battery may be secured by uniformly forming a heat-resistance porous layer on a substrate and suppressing short-circuit between positive and negative electrodes and in addition, minimizing resistance of lithium ions.

An amount of the filler may be 50 wt % to 95 wt %, for example, 50 wt % to 80 wt % based on a total amount of the heat-resistance porous layer, specifically the heat-resistance porous layer and specifically the cross-linked binder and the filler. When the filler is included within the amount ranges, cell performance may be improved by preventing the shrinkage of a substrate and suppressing short-circuit between positive and negative electrodes.

Hereinafter, a separator for a lithium secondary battery according to another embodiment is described.

The separator for a lithium secondary battery according to the present embodiment includes a substrate and a heat-resistance porous layer disposed on at least one surface of the substrate, wherein the heat-resistance porous layer may include a binder and a filler. Herein, the binder may include the cross-linked binder and non-cross-linked binder. Since the separator according to the present embodiment further includes non-cross-linked binder unlike the separator according to the aforementioned embodiment even though the other constituent elements are substantially the same, the non-cross-linked binder will be mainly illustrated herein.

The non-crosslinked binder is a compound that is different from the cross-linked binder and may be a compound without a cross-linkable functional group. The non-cross-linked binder may be a vinylidene fluoride-based polymer such as a polyvinylidene fluoride (PVdF) homopolymer, a polyvinylidene fluoride-hexafluoropropylene (PVdF-HFP) copolymer, and the like, polymethylmethacrylate, polyacrylonitrile, polyvinylpyrrolidone, polyvinylacetate, polyethylene-vinylacetate copolymer, polyethyleneoxide, cellulose acetate, cellulose acetate butyrate, cellulose acetate propionate, cyanoethylpullulan, cyanoethylpolyvinyl alcohol, cyanoethyl cellulose, cyanoethyl sucrose, pullulan, carboxylmethyl cellulose, an acrylonitrile-styrene-butadiene copolymer, or a combination thereof. For example, the non-cross-linked binder may be the polyvinylidene fluoride (PVdF) homopolymer, the polyvinylidene fluoride-hexafluoropropylene (PVdF-HFP) copolymer, or a combination thereof. When the polyvinylidene fluoride (PVdF) homopolymer, the polyvinylidene fluoride-hexafluoropropylene (PVdF-HFP) copolymer, or combination thereof is used with the cross-linked binder, adherence to the substrate may increase and uniform heat-resistance porous layer may be formed, and thus safer separator may be ensured. In addition, the separator has excellent impregnation properties in an electrolyte solution and may improve high-rate charge and discharge characteristics of a battery.

The vinylidene fluoride-based polymer may have a weight average molecular weight of 300,000 g/mol to 1,700,000 g/mol, and specifically 500,000 g/mol to 1,500,000 g/mol, but is not limited thereto. When the weight average molecular weight of the vinylidene fluoride-based polymer is within the ranges, adherence of the substrate and the heat-resistance porous layer may be fortified and adherence to an electrode may be also improved. In addition, the vinylidenefluoride-based polymer may also be well dissolved in a small amount of a solvent during formation of a heat-resistance porous layer and facilitate drying of the heat-resistance porous layer as well as suppress a thermal shrinkage of a substrate and prevent short-circuit between positive and negative electrodes.

The polyvinylidene fluoride-hexafluoropropylene (PVdF-HFP) copolymer may include 0.1 wt % to 40 wt %, for example, 1 wt % to 20 wt % of a repeating unit derived from hexafluoropropylene based on a total amount of a repeating unit derived from vinylidenefluoride and a repeating unit derived from hexafluoropropylene, but is not limited thereto.

The cross-linked binder and the non-cross-linked binder may be included in a weight ratio of 2:8 to 8:2, for example, 4:6 to 6:4. When cross-linked binder and the non-cross-linked binder are mixed in the weight ratio ranges, heat resistance and electrolyte solution wettability are improved and adherence to a substrate may be fortified and thus a significantly improved separator may be ensured.

In addition, the filler may be included in an amount of 20 wt % to 95 wt %, for example, 70 wt % to 95 wt % or 70 wt % to 92 wt % based on a total amount of the binder including the cross-linked binder and the non-crosslinked binder and the filler. When the filler is included within the amount range, cell performance may be improved by preventing the shrinkage of a substrate and suppressing short-circuit between positive and negative electrodes.

Each shrinkage ratio in a machine direction (MD) and a transverse direction (TD) of the separator according to the present embodiments may be less than or equal to 5%, for example 4%, according to Equation 1. Herein, the transverse direction is perpendicular to the machine direction, and the shrinkage ratio indicates the length change of a separator after thermal shrinkage in each machine and transverse direction. When the shrinkage ratio is within the ranges, a stable lithium secondary battery during battery explosion and overheating may be realized.

$$\text{Shrinkage ratio (\%)} = [(L0-L1)/L0] \times 100 \quad \text{[Equation 1]}$$

(In Equation 1, L0 indicates an initial length of a separator and L1 indicates a length of a separator after being allowed to stand at 200° C. and for 10 minutes.)

Hereinafter, a method of manufacturing a separator for a lithium secondary battery according to an embodiment is described.

A method of manufacturing a separator for a lithium secondary battery according to an embodiment may include coating a composition including a cross-linked binder and a solvent on at least one surface of a substrate and curing the same to form a heat-resistance porous layer.

First, a composition for the heat-resistance porous layer including the cross-linked binder, an initiator, and the solvent is coated on at least one surface of the substrate.

Specifically, the composition for the heat-resistance porous layer may be prepared by mixing the cross-linked binder, the initiator, and the solvent and stirring the same at 10° C. to 40° C. for 30 minutes to 5 hours. Herein, 1 wt % to 30 wt % of the cross-linked binder and a balance amount of the solvent are mixed, and the initiator may be added thereto in an amount of 1 part by weight to 10 parts by weight, for example 1 part by weight to 5 parts by weight based on 100 parts by weight of the ether-based compound.

The cross-linked binder is the same as described above. The solvent may be alcohols such as methanol, ethanol, and isopropylalcohol; ketones such as acetone, but is not limited thereto.

The initiator may be a photoinitiator, a thermal initiator, or a combination thereof.

The photoinitiator may be used for photo-polymerization using ultraviolet rays. Examples of the photoinitiator may be acetophenones such as diethoxyacetophenone, 2-hydroxy-2-methyl-1-phenylpropan-1-one, benzyldimethylketal, 1-hydroxycyclohexyl-phenylketone, and 2-methyl-2-morphine(4-thiomethylphenyl)propan-1-one; benzoinethers such as benzoinmethylether, benzoinethylether, benzoinisopropylether, and benzoinisobutylether; benzophenones such as benzophenone, o-benzoyl methyl benzoate, 4-phenylbenzophenone, 4-benzoyl-4'-methyldiphenylsulfurous acid, 4-benzoyl-N,N-dimethyl-N-[2-(1-oxo-2-propenyloxy)ethyl]benzenemetanamium bromide, and (4-benzoylbenzyl)trimethyl ammonium chloride; thioxanthones such as 2,4-diethylthioxanthone, and 1-chloro-4-dichlorothioxanthone; 2,4,6-trimethylbenzoyldiphenylbenzoyloxide, and the like. These may be used alone or as a mixture of two or more.

The thermal initiator may be used for a thermal polymerization. The thermal initiator may include organic peroxide radical initiator such as diacyl peroxides, peroxyketals, ketone peroxides, hydroperoxides, dialkylperoxides, peroxyesters, peroxydicarbonates, and for example, lauroyl peroxide, benzoyl peroxide, cyclohexanone peroxide, 1,1-bis(t-butylperoxy)-3,3,5-trimethylcyclohexane, t-butylhydroperoxide may be used alone or as a mixture of two or more.

The composition for the heat-resistance porous layer may further include a filler and may also further include a non-cross-linked binder. The filler and the non-cross-linked binder are the same as described above.

The stirring may be performed using a ball mill, a beads mill, a screw mixer, and the like.

The composition for the heat-resistance porous layer may be coated in a method of dip coating, die coating, roll coating, comma coating, and the like, but the present disclosure is not limited thereto.

After the composition for the heat-resistance porous layer, a drying process may be further performed. The drying process may be performed at 80° C. to 100° C. for 5 seconds to 60 seconds in a batch or continuous method.

Subsequently, the coated composition for a heat-resistance porous layer is cured to form a heat-resistance porous layer.

The curing may be performed through photocuring, thermal curing, or a combination thereof. The photocuring may be for example performed by radiating UV of 150 nm to 170 nm for 5 seconds to 60 seconds. In addition, the thermal curing may be for example performed at a temperature of 60° C. to 120° C. for 1 hour to 36 hours, for example, at a temperature of 80° C. to 100° C. for 10 hours to 24 hours.

The heat-resistance porous layer may be formed on a substrate in a method of lamination, coextrusion, and the like other than the coating of the coating composition.

Hereinafter, a lithium secondary battery including the separator is described referring to FIG. 1.

FIG. 1 is an exploded perspective view showing a lithium secondary battery according to an embodiment. A prismatic lithium secondary battery according to an embodiment is for example illustrated, but the present disclosure is not limited thereto and may be applied to various batteries such as a lithium polymer battery and a cylindrical battery.

Referring to FIG. 1, a lithium secondary battery 100 according to an embodiment includes an electrode assembly 40 in which a separator 30 interposed between a positive electrode 10 and a negative electrode 20, and a case 50 housing the electrode assembly 40. The positive electrode 10, the negative electrode 20 and the separator 30 are impregnated in an electrolyte solution (not shown).

The separator 30 is the same as described above.

The positive electrode 10 includes a positive current collector and a positive active material layer formed on the positive current collector. The positive active material layer includes a positive active material, a binder, and optionally a conductive material.

The positive current collector may use aluminum (Al), nickel (Ni), and the like, but is not limited thereto.

The positive active material may use a compound being capable of intercalating and deintercallating lithium. Specifically at least one of a composite oxide or a composite phosphate of a metal selected from cobalt, manganese, nickel, aluminum, iron, or a combination thereof and lithium may be used. More specifically, the positive active material may use lithium cobalt oxide, lithium nickel oxide, lithium manganese oxide, lithium nickel cobalt manganese oxide, lithium nickel cobalt aluminum oxide, lithium iron phosphate, or a combination thereof.

The binder improves binding properties of positive active material particles with one another and with a current collector. Specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more.

The conductive material improves conductivity of an electrode. Examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrode 20 includes a negative current collector and a negative active material layer formed on the negative current collector.

The negative current collector may use copper (Cu), gold (Au), nickel (Ni), a copper alloy, and the like, but is not limited thereto.

The negative active material layer may include a negative active material, a binder and optionally a conductive material.

The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be graphite such as amorphous, sheet-shape, flake, spherical shape or fiber-shaped natural graphite or artificial graphite. Examples of the amorphous carbon may be soft carbon (low temperature fired carbon) or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ (0<x<2), a Si—C composite, a Si—Y alloy, Sn, $SnO_2$, a Sn—C composite, a Sn—Y, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, and the like.

The binder and the conductive material used in the negative electrode may be the same as the binder and conductive material of the positive electrode.

The positive electrode and the negative electrode may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte solution includes an organic solvent and a lithium salt.

The organic solvent serves as a medium for transmitting ions taking part in the electrochemical reaction of a battery. Specific examples thereof may be selected from a carbonate-based solvent, an ester-based solvent, an ether-based solvent, a ketone-based solvent, an alcohol-based solvent, and an aprotic solvent.

Examples of the carbonate-based solvent may be dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like. Particularly, when the linear carbonate compounds and cyclic carbonate compounds are mixed, an organic solvent having a high dielectric constant and a low viscosity may be provided. The cyclic carbonate compound and the linear carbonate compound are mixed together in a volume ratio ranging from 1:1 to 1:9.

Examples of the ester-based solvent may be methylacetate, ethylacetate, n-propylacetate, dimethylacetate, methylpropionate, ethylpropionate, γ-butyrolactone, decanolide, valerolactone, mevalonolactone, caprolactone, and the like. Examples of the ether-based solvent may be dibutylether, tetraglyme, diglyme, dimethoxyethane, 2-methyltetrahydrofuran, tetrahydrofuran, and the like. Examples of the ketone-based solvent may be cyclohexanone, and the like, and examples of the alcohol-based solvent may be ethanol, isopropyl alcohol, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the lithium secondary battery, and improves lithium ion transportation between positive and negative electrodes therein.

Examples of the lithium salt may be $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x}SO_2)$ $(C_yF_{2y+1}SO_2)$, x and y are natural numbers, LiCl, LiI, $LiB(C_2O_4)_2$, or a combination thereof.

The lithium salt may be used in a concentration ranging from 0.1 M to 2.0 M. When the lithium salt is included within the above concentration range, an electrolyte may have excellent performance and lithium ion mobility due to optimal electrolyte conductivity and viscosity.

The lithium secondary battery including the separator may realize high capacity without degradation of cycle-life characteristics.

Embodiments for Carrying Out the Invention

Hereinafter, the embodiments are illustrated in more detail with reference to examples. These examples, however, are not in any sense to be interpreted as limiting the scope of the invention. Furthermore, what is not described in this disclosure may be sufficiently understood by those who have knowledge in this field and will not be illustrated here.

(Manufacture of Separator)

Example 1

7 wt % of polyvinylidene fluoride (PVdF) (KUREHA Inc., KF9300), 25 wt % of dimethyl acetamide (DMAC, Daejung Chemicals & Metals Co., Ltd.), and 68 wt % of acetone were mixed in a stirrer at 40° C. for 4 hours to obtain a binder solution. In addition, 25 wt % of $Al_2O_3$ and 75 wt % of acetone were mixed at 25° C. for 2 hours using a beadmill to obtain inorganic dispersion liquid.

0.7 wt % of an ether-based compound represented by Chemical Formula 5 (Hannong Chemicals Inc., PE-044), 0.035 wt % of benzoyl peroxide, 6.9 wt % of the binder solution, 55.4 wt % of the inorganic dispersion liquid, and 36.965 wt % of acetone were mixed to prepare slurry.

The slurry was dip-coated to be respectively 2 μm thick, that is, 4 μm thick in total on both sides of a 7 μm-thick single polyethylene film as a substrate, dried at 100° C. for 10 seconds, and cured at 90° C. for 24 hours, manufacturing a separator.

[Chemical Formula 5]

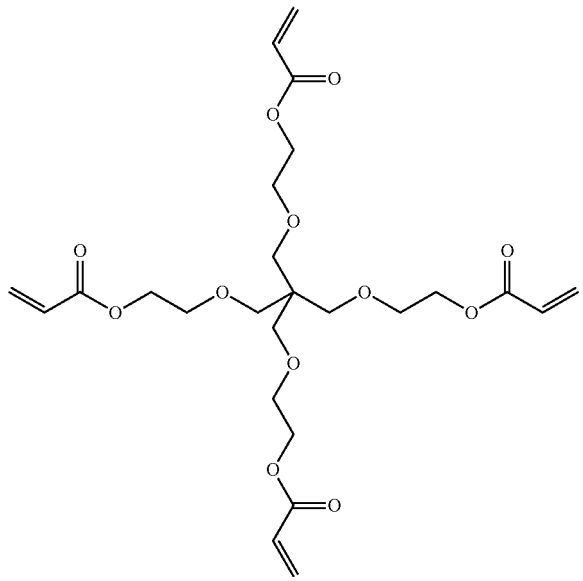

Example 2

A separator was manufactured according to the same method as Example 1 except for using an ether-based compound represented by Chemical Formula 6 (Hannong Chemicals Inc., TP-063) instead of the ether-based compound represented by Chemical Formula 5.

[Chemical Formula 6]

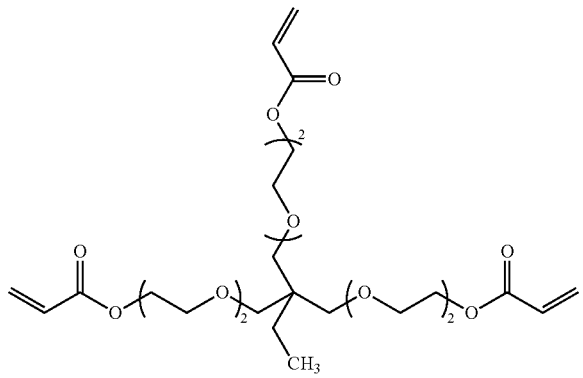

Example 3

A separator was manufactured according to the same method as Example 1 except for using an ether-based compound represented by Chemical Formula 7 (Hannong Chemicals Inc., TP-093) instead of the ether-based compound represented by Chemical Formula 5.

[Chemical Formula 7]

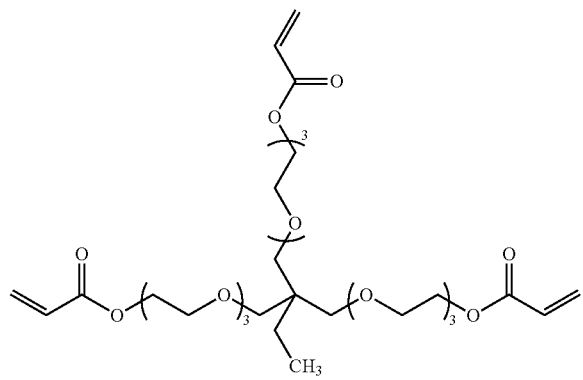

Comparative Example 1

A separator was manufactured according to the same method as Example 1 except for mixing 12.8 wt % of the binder solution of Example 1, 43.6 wt % of the inorganic dispersion liquid, and 43.6 wt % of acetone to prepare slurry.

Comparative Example 2

A separator was manufactured according to the same method as Example 1 except for using an ether-based compound represented by Chemical Formula 8 (Aldrich) instead of the ether-based compound represented by Chemical Formula 5.

[Chemical Formula 8]

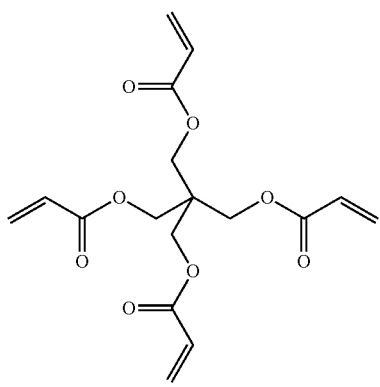

Comparative Example 3

A separator was manufactured according to the same method as Example 1 except for using an ether-based compound represented by Chemical Formula 9 (Hannong Chemicals Inc., BP-042) instead of the ether-based compound represented by Chemical Formula 5.

[Chemical Formula 9]

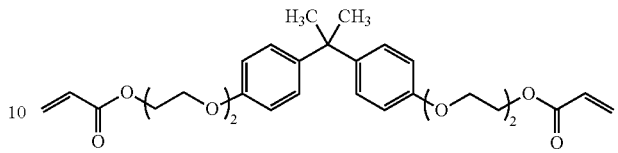

Comparative Example 4

A separator was manufactured according to the same method as Example 1 except for using an ether-based compound represented by Chemical Formula 10 (Gelest, UMS-182) instead of the ether-based compound represented by Chemical Formula 5.

[Chemical Formula 10]

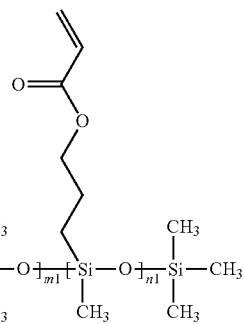

(In Chemical Formula 10, $m^1=10$ and $n^1=4$)

Comparative Example 5

A separator was manufactured according to the same method as Example 1 except for using an ether-based compound represented by Chemical Formula 11 (Gelest, DBE-U12) instead of the ether-based compound represented by Chemical Formula 5.

[Chemical Formula 11]

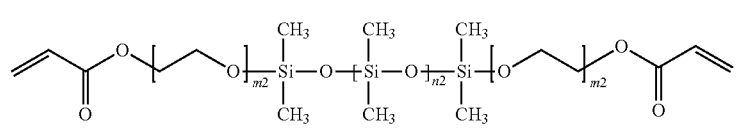

(In Chemical Formula 10, $m^2=9$ and $n^2=8$)

(Manufacture of Lithium Secondary Battery Cell)

$LiCoO_2$, polyvinylidene fluoride, and carbon black in a weight of 96:2:2 were added to an N-methylpyrrolidone (NMP) solvent, preparing slurry. The slurry was coated on an aluminum (Al) thin film and dried, manufacturing a positive electrode.

Graphite, a styrene-butadiene rubber, and carboxyl methyl cellulose were added to water in a weight ratio of 97.5:1.5:1, preparing slurry. The slurry was coated on a copper foil, dried, and compressed, manufacturing a negative electrode.

An electrolyte solution was prepared by mixing ethylene carbonate (EC), ethylmethyl carbonate (EMC), and diethyl carbonate (DEC) in a volume ratio of 3:5:2 and adding 1.15 M $LiPF_6$ to the mixed solvent.

The manufactured positive electrode and negative electrode, and the electrolyte solution, and each separator according to Example 1 to 3 and Comparative Example 1 to 5 were used to manufacture lithium secondary battery cells.

Evaluation 1: Heat Resistance of Separator

The heat resistance of each separator according to Examples 1 to 3 and Comparative Examples 1 to 5 was evaluated by measuring a thermal shrinkage ratio in the following method, and the results are shown in Table 1.

A sample was prepared by cutting each separator into a size of 10 cm×10 cm and allowed to stand at 200° C. in a convection oven) for 10 minutes, and the shrinkage ratios of the samples in MD (a machine direction) and TD (a transverse direction) was measured. The shrinkage ratio was calculated according to Equation 1.

Shrinkage ratio (%)=[(LO−L1)/LO]×100 [Equation 1]

(In Equation 1, LO indicates an initial length of the separator and L1 indicates a length of the separator after being allowed to stand at 200° C. for 10 minutes.)

TABLE 1

|  | Shrinkage ratio (%) | |
| --- | --- | --- |
|  | MD | TD |
| Example 1 | 3 | 4 |
| Example 2 | 3 | 4 |
| Example 3 | 3 | 4 |
| Comparative Example 1 | 40 | 30 |
| Comparative Example 2 | 5 | 5 |
| Comparative Example 3 | 35 | 34 |
| Comparative Example 4 | 50 | 52 |
| Comparative Example 5 | 54 | 50 |

Referring to Table 1, Examples 1 to 3 using the cross-linked binder formed from the ether-based compound represented by Chemical Formula 2 to form the heat-resistance porous layer of the separator showed a low thermal shrinkage ratio and thus improved heat resistance compared with Comparative Example 1 not using the cross-linked binder, Comparative Example 2 using the compound without an oxyethylene group in the molecule, and Comparative Examples 3 to 5 using compounds different from Chemical Formula 2. Accordingly, the separators may realize stable lithium secondary battery cells during battery explosion and overheating.

Evaluation 2: Penetration Safety Test of Lithium Secondary Battery Cell

Penetration safeties of the lithium secondary battery cells according to Examples 1 to 3 and Comparative Examples 1 to 5 were evaluated in the following method, and the results are shown in Table 2.

Penetration limitation evaluation was performed using a 2.5 π nail at a penetration speed of Table 2.

TABLE 2

|  | Penetration speed (cm/min) | |
| --- | --- | --- |
|  | 240 | 120 |
| Example 1 | L1 | L1 |
| Example 2 | L1 | L1 |
| Example 3 | L1 | L1 |
| Comparative Example 1 | L4 | L4 |
| Comparative Example 2 | L4 | L4 |
| Comparative Example 3 | L4 | L4 |
| Comparative Example 4 | L4 | L4 |
| Comparative Example 5 | L4 | L4 |

In Table 2, L0 to L5 are as follows with a reference to UL.
L0: no leakage
L1: leakage and heat of less than 150° C.
L2: heat of less than 200° C.
L3: smoke and heat of greater than 200° C.
L4: flame
L5: explosion Referring to Table 2, Examples 1 to 3 including heat-resistance porous layers of separators formed using the cross-linked binders according to embodiments showed excellent penetration characteristics compared with Comparative Examples 1 to 5. From the results, when using the separators according to an embodiment, shapes thereof were maintained at a high temperature and short-circuit inhibition efficiency between electrodes were increased to improve safety of the lithium secondary battery cells.

Evaluation 3: Rate Capability of Lithium Secondary Battery Cell

The lithium secondary battery cells according to Examples 1 to 3 and Comparative Examples 1 to 5 were charged and discharged to evaluate rate capability and the results are shown in Table 4.

Formation at 0.2 C (1 C=2500 mAh) after cell aging was performed and rate efficiency was evaluated according to the process order of Table 3.

TABLE 3

|  | Cut-off voltage (V) | Charge C-rate | Discharge C-rate |
| --- | --- | --- | --- |
|  | 4.35 to 3.0 | 0.2 C | 0.2 C |
|  | 4.35 to 3.0 | 0.2 C | 0.2 C |
|  | 4.35 to 3.0 | 0.5 C | 0.5 C |
|  | 4.35 to 3.0 | 0.5 C | 1 C |
| Residual discharge | 4.35 to 2.75 | 0.2 C | 0.2 C |
|  | 4.35 to 3.0 | 0.5 C | 1.5 C |
| Residual discharge | 4.35 to 2.75 | 0.2 C | 0.2 C |
|  | 4.35 to 3.0 | 0.5 C | 2 C |
| Residual discharge | 4.35 to 2.75 | 0.2 C | 0.2 C |
|  | 4.35 to 3.0 | 0.5 C | 2.5 C |

In Table 4, rate efficiency (%) was obtained as a percentage by considering discharge capacity at $2^{nd}$ cycle of 0.2 C as an initial capacity and calculating C-rate discharge capacity relative to the initial capacity.

TABLE 4

|  | 0.2 C capacity | Rate efficiency (%) | | | | |
| --- | --- | --- | --- | --- | --- | --- |
|  | (mAh) | 0.5 C | 1 C | 1.5 C | 2 C | 2.5 C |
| Example 1 | 2578.2 | 99.6 | 98.9 | 97.8 | 96.2 | 94.3 |
| Example 2 | 2570.0 | 99.6 | 98.9 | 97.9 | 96.4 | 94.5 |

TABLE 4-continued

| | 0.2 C capacity (mAh) | Rate efficiency (%) | | | | |
|---|---|---|---|---|---|---|
| | | 0.5 C | 1 C | 1.5 C | 2 C | 2.5 C |
| Example 3 | 2590.5 | 99.6 | 98.9 | 98.0 | 96.8 | 95.0 |
| Comparative Example 1 | 2611.1 | 99.6 | 98.9 | 97.7 | 95.6 | 92.9 |
| Comparative Example 2 | 2571.3 | 99.6 | 98.9 | 97.6 | 95.8 | 93.3 |
| Comparative Example 3 | 2590.3 | 99.6 | 98.9 | 97.6 | 95.6 | 93.1 |
| Comparative Example 4 | 2571.8 | 99.6 | 98.9 | 97.6 | 95.9 | 93.3 |
| Comparative Example 5 | 2600.1 | 99.6 | 98.9 | 97.6 | 95.3 | 92.8 |

Referring to Table 4, Examples 1 to 3 including heat-resistance porous layers of separators formed using the cross-linked binders according to embodiments showed high rate capability compared with Comparative Examples 1 to 5. From the results, when the cross-linked binder formed from the ether-based compound according to an embodiment is used in the heat-resistance porous layer of the separator, mobility of lithium ions is improved and thereby high rate capability is improved.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. A separator for a lithium secondary battery, comprising:
a substrate, and
a heat-resistance porous layer disposed on at least one surface of the substrate and including a cross-linked binder,
wherein the cross-linked binder has a cross-linking structure formed from a compound represented by Chemical Formula 2,

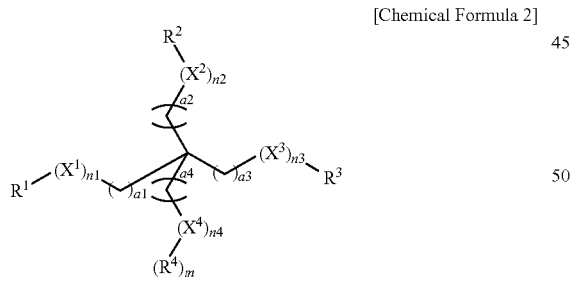

[Chemical Formula 2]

wherein, in Chemical Formula 2,
$X^1$ to $X^3$ are an oxyethylene group, respectively,
$X^4$ is an oxyethylene group or a C1 to C10 alkyl group, when $X^4$ is the oxyethylene group, $n^4$ is an integer ranging from 1 to 10 and m is 1 and when $X^4$ is the C1 to C10 alkyl group, $n^4$ is 1 and m is 0,
$R^1$ to $R^4$ are a functional group of a (meth)acrylate group, a hydroxy group, a carboxyl group, an ester group, a cyanate group, an isocyanate group, an amino group, a thiol group, a C1 to C10 alkoxy group, a vinyl group, or a heterocyclic group,
each of $a^1$ to $a^4$ are an integer ranging from 1 to 10,
each of $n^1$ to $n^3$ are an integer ranging from 0 to 10, and at least one of $n^1$ to $n^4$ is an integer ranging from 1 to 10,
wherein the heat-resistance porous layer further comprises a non-crosslinked binder,
wherein the non-crosslinked binder comprises polyvinylidene fluoride (PVdF), a polyvinylidene fluoride-hexafluoropropylene (PVdF-HFP) copolymer, polymethylmethacrylate, polyacrylonitrile, polyvinylpyrrolidone, polyvinylacetate, polyethylenevinylacetate copolymer, polyethyleneoxide, cellulose acetate, cellulose acetate butyrate, cellulose acetate propionate, cyanoethylpullulan, cyanoethylpolyvinyl alcohol, cyanoethyl cellulose, cyanoethylsucrose, pullulan, an acrylonitrile-styrene-butadiene copolymer, or a combination thereof, and
wherein each shrinkage ratio in a machine direction (MD) and a transverse direction (TD) of the separator is less than or equal to 5% according to Equation 1, $$\text{Shrinkage ratio (\%)} = [(LO-L1)/LO] \times 100 \quad \text{[Equation 1]}$$

wherein, in Equation 1, LO indicates an initial length of a separator and L1 indicates a length of a separator after being allowed to stand at 200° C. and for 10 minutes.

2. A separator for a lithium secondary battery, comprising:
a substrate, and
a heat-resistance porous layer disposed on at least one surface of the substrate and including a cross-linked binder,
wherein the cross-linked binder has a cross-linking structure formed from a compound represented by Chemical Formula 2,

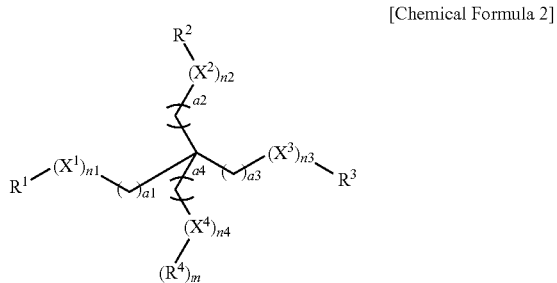

[Chemical Formula 2]

wherein, in Chemical Formula 2,
$X^1$ to $X^3$ are an oxyethylene group, respectively,
$X^4$ is an oxyethylene group or a C1 to C10 alkyl group, when $X^4$ is the oxyethylene group, $n^4$ is an integer ranging from 1 to 10 and m is 1 and when $X^4$ is the C1 to C10 alkyl group, $n^4$ is 1 and m is 0,
$R^1$ to $R^4$ are a functional group of a (meth)acrylate group, a hydroxy group, a carboxyl group, an ester group, a cyanate group, an isocyanate group, an amino group, a thiol group, a C1 to C10 alkoxy group, a vinyl group, or a heterocyclic group,
each of $a^1$ to $a^4$ are an integer ranging from 1 to 10,
each of $n^1$ to $n^3$ are an integer ranging from 0 to 10, and at least one of $n^1$ to $n^4$ is an integer ranging from 1 to 10,
wherein the heat-resistance porous layer further comprises a non-crosslinked binder,
wherein the non-crosslinked binder comprises polyvinylidene fluoride (PVdF), a polyvinylidene fluoride-hexafluoropropylene (PVdF-HFP) copolymer, polymethylmethacrylate, polyacrylonitrile, polyvinylpyrrolidone, polyvinylacetate, polyethylene-vinylacetate copolymer, polyethyleneoxide, cellulose acetate, cellulose acetate butyrate, cellulose acetate propionate, cyanoethylpullulan, cyanoethylpolyvinyl alcohol, cyanoethyl cellulose, cyanoethylsucrose, pullulan, an acrylonitrile-styrene-butadiene copolymer, or a combination thereof, and wherein the compound includes a compound represented by Chemical Formula 3 or 4:

[Chemical Formula 3]

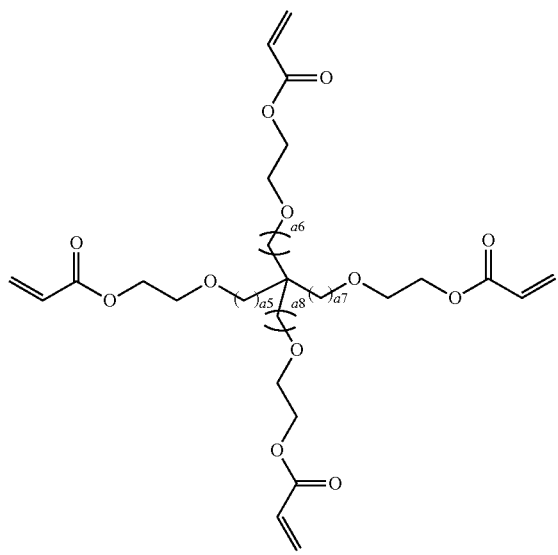

[Chemical Formula 4]

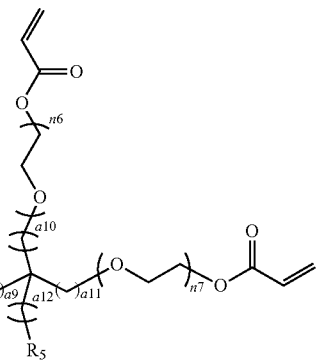

wherein, in Chemical Formulae 3 and 4, $R^5$ is a C1 to C10 alkyl group, each of $n^5$ to $n^7$ are an integer of 1 to 5, and each of $a^5$ to $a^{12}$ are an integer of 1 to 10.

3. The separator for a lithium secondary battery of claim 1, wherein the heat-resistance porous layer includes a filler including an inorganic particle, an organic particle, or a combination thereof.

4. The separator for a lithium secondary battery of claim 3, wherein the filler is included in an amount of 50 wt % to 95 wt % based on a total amount of the cross-linked binder and the filler.

5. A lithium secondary battery comprising the separator according to claim 1.

* * * * *